(12) United States Patent
Richter

(10) Patent No.: US 7,735,668 B2
(45) Date of Patent: Jun. 15, 2010

(54) LARGE-VOLUME CONTAINER COMPRISING TWO PARTS AND A SUPPORT DEVICE LOCATED IN THE CONNECTION REGION

(76) Inventor: Günter Richter, Johannistal 12, 57610 Altenkirchen (DE)

( * ) Notice: Subject to any disclaimer, the term of this patent is extended or adjusted under 35 U.S.C. 154(b) by 1139 days.

(21) Appl. No.: 10/527,612

(22) PCT Filed: Sep. 10, 2003

(86) PCT No.: PCT/EP03/10044

§ 371 (c)(1),
(2), (4) Date: Mar. 11, 2005

(87) PCT Pub. No.: WO2004/026711

PCT Pub. Date: Apr. 1, 2004

(65) Prior Publication Data

US 2006/0124640 A1    Jun. 15, 2006

(30) Foreign Application Priority Data

Sep. 12, 2002   (DE) ............................. 102 42 387

(51) Int. Cl.
*B65D 6/28* (2006.01)
*B65D 8/18* (2006.01)

(52) U.S. Cl. .................. 220/4.21; 220/567.1

(58) Field of Classification Search ............... 220/4.13, 220/4.14, 4.21, 4.24, 23.2, 563, 567.1, 682–684, 220/685, 688, 4.27, 567.2

See application file for complete search history.

(56) References Cited

U.S. PATENT DOCUMENTS

| 3,176,879 | A | * | 4/1965 | Mojonnier | 222/143 |
| 3,405,862 | A | * | 10/1968 | Spyra | 229/5.6 |
| 4,527,709 | A | * | 7/1985 | Kondo et al. | 220/501 |
| 5,073,420 | A | * | 12/1991 | Yano et al. | 428/35.7 |

FOREIGN PATENT DOCUMENTS

| CH | 598 091 | 4/1978 |
| DE | 1 787 190 | 4/1959 |
| DE | 38 33 646 | 4/1990 |
| DE | 200 18 080 | 2/2001 |
| DE | 201 05 030 | 8/2001 |

* cited by examiner

*Primary Examiner*—Anthony Stashick
*Assistant Examiner*—Harry A Grosso
(74) *Attorney, Agent, or Firm*—Friedrich Kueffner

(57) ABSTRACT

What is described is a plastic container consisting of two container parts (12, 14) which are connected to one another in an opening region. Each container part (12, 14) has a single connection frame (26, 28) which includes the connection opening. The container parts (12, 14) can be connected to one another along the facing connection frames (26, 28). At least one connection frame (26, 28) includes a support device (30, 34; 54) which extends in the connection frame (26, 28) in the vertical direction.

14 Claims, 6 Drawing Sheets

LARGE-VOLUME CONTAINER COMPRISING TWO PARTS AND A SUPPORT DEVICE LOCATED IN THE CONNECTION REGION

BACKGROUND OF THE INVENTION

1. Field of the Invention

The invention relates to a plastic container consisting of two container parts which are connected to one another in an opening region.

2. Description of the Related Art

A container of this type is known from DE 201 05 030 U1 of the same applicant. The container described serves to store liquids and consists of at least two separately manufactured and largely identical container parts. Each container part includes an upper and a lower flow nozzle having an aperture. The two container parts are connected to one another in the region of the upper flow nozzle as well as in the region of the lower flow nozzle. Further, the container parts include stiffening corrugations for increasing stability.

Such a container can be used for collecting rainwater or waste water and should be suitable for underground storage. Known containers have a spherical, cylindrical or rectangular geometry. For rectangular containers, generally a width which is small compared with the length is chosen in order to withstand soil loads.

In order to obtain a large volume, the height of the container must then be chosen high, this requiring a high mounting depth. For reasons of soil quality, such as in the case of stony soils or given the presence of ground water, it is often necessary to keep the mounting depth as low as possible.

SUMMARY OF THE INVENTION

The object of the invention is to provide a plastic container which has a high capacity and, at the same time, is suitable for underground use and has a high stability.

According to the invention, the already described principle is maintained according to which the container is assembled of two container parts. In this way, the container parts can be manufactured with the aid of relatively small blowing molds and can be transported well. Each container part has a single connection frame which includes the connection opening. At least one connection frame includes a support device which extends in the vertical direction. As a result, the entire container is supported in the region of the interconnected connection frames and the strength is increased in this region. Thus, the container which is assembled of the two container parts has a high dimensional stability, can take high soil loads and can withstand buoyancy forces in the ground water.

In one embodiment, the respective connection frame has a circular shape, the outer diameter of which approximately corresponds to the height of the container. As a result, a large opening surface for the exchange of liquid can be provided between the two container parts. Further, with a large diameter of the connection frame the required connection of the two container parts at the place of mounting, for example by means of welding, can be implemented more easily.

According to another embodiment, the base area of the container is approximately square. Accordingly, such a container can be easily embedded in the soil of an existing square piece of land. The increased soil loads and buoyancy forces occurring in this connection are absorbed by the supporting device.

BRIEF DESCRIPTION OF THE DRAWINGS

Embodiments of the invention are explained in the following on the basis of the drawings.

DETAILED DESCRIPTION OF THE PREFERRED EMBODIMENTS

Figure 1:
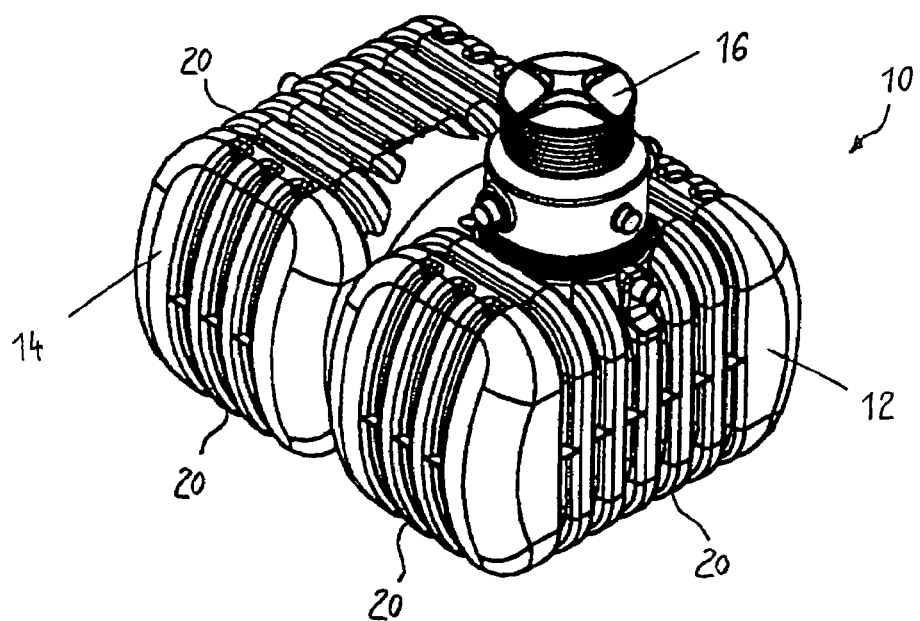
FIG. 1 is a perspective view of a first embodiment of the invention.

FIG. 1 shows, in a perspective view, an embodiment of the invention in which a container 10 is assembled of two container parts 12, 14. The two container parts 12, 14 are made of plastic, for example of high-molecular high density polyethylene, and are manufactured by means of blow molding. The first container part 12 has a filling and emptying opening 16. With regard to the rest, the two container parts 12, 14 are identically structured so that each container part 12, 14 can be manufactured by using the same blowing mold. Only for the first container part 12 having a filling neck 18 (see FIG. 2), a mold insert is placed into the blowing mold.

Figure 2:
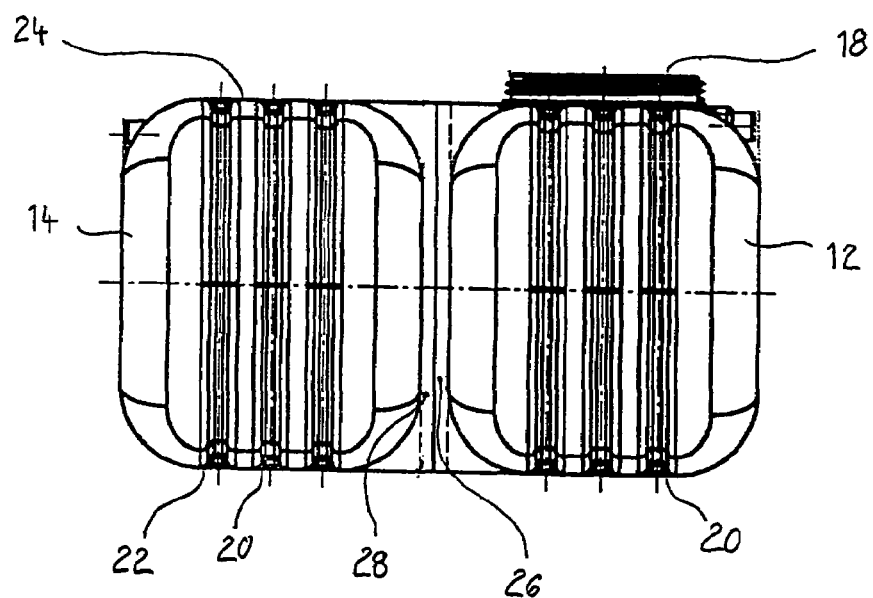
FIG. 2 is a side view of the container illustrated in FIG. 1.

FIG. 2 is a side view of the container 10, the unit for the filling and emptying opening 16 being disassembled; thus in the upper wall 24 only a filling neck 18 can be seen via which the entire container 10 can be filled and emptied.

Each container part 12, 14 includes in its circumferential surface stiffening corrugations 20 which serve to stiffen the outer shape of the container 10. These stiffening corrugations 20 are channel-like recesses which are formed in the circumferential surface during the plastic blowing. The stiffening corrugations 20 increase the rigidity of the outer casing so that the soil load and the buoyancy forces occurring due to the ground water are taken into account. The container parts 12, 14 are rounded at their edges and also present the stiffening corrugations 20 mentioned above in their circumferential surface in the lower wall 22 and the upper wall 24.

Each container part 12, 14 has a single connection frame 26 or, respectively, 28, along which the two container parts 12, 14 are joined together.

For a useable volume of 5000 liters liquid, the container 10 typically has a square base size of approximately 2.3 m given a height of 1.35 m. The neck 18 has a typical diameter of 0.7 m.

Figure 3:
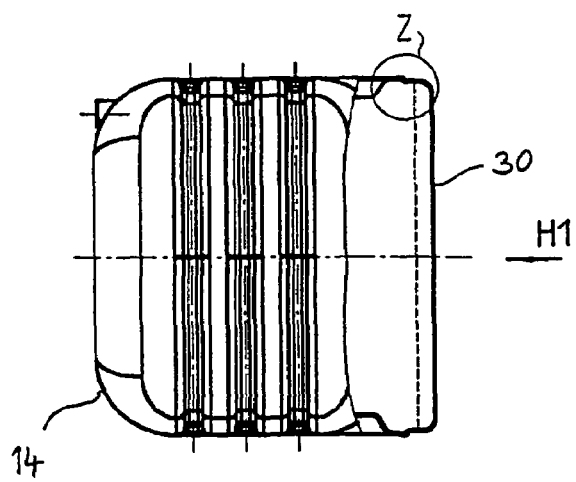
FIG. 3 shows a container part having a not yet separated partition wall formed in one piece with the container part.

FIG. 3 shows the container part 14 which is manufactured by means of plastic blow molding. With this type of manufacture, a partition wall 30 serving as a support device is formed integrally therewith, the structure of which can be seen in more detail in FIG. 4 as detail Z on a scale of 1:4 and in FIG. 5 in a view as seen from the direction H1.

Figure 4:
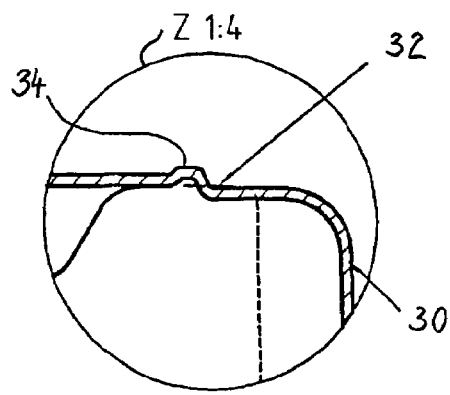
FIG. 4 is a detail from FIG. 3.

FIG. 4 shows that a raised edge 34 is formed along the circumference of the outer casing of the container part 14. At the point 32, the partition wall 30 is then separated along the circumference.

Figure 5:
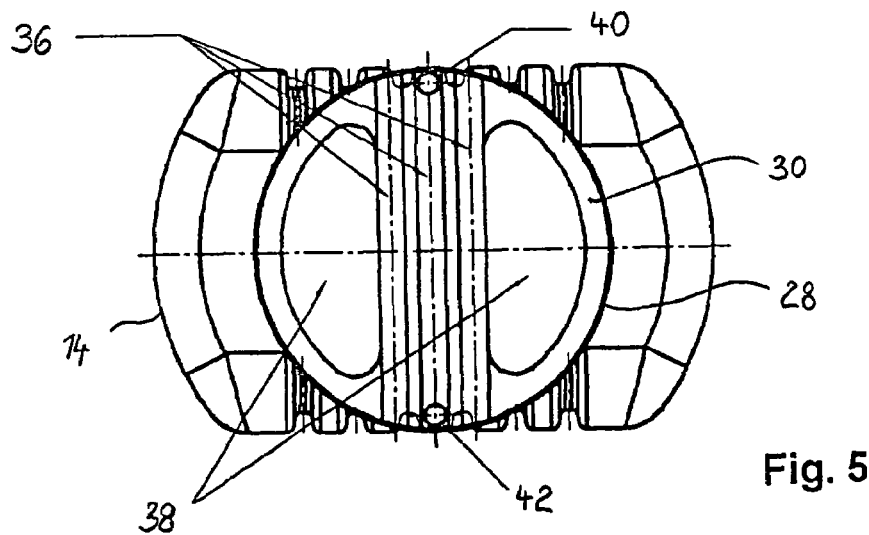
FIG. 5 is a view of FIG. 3 as viewed from the direction H1.

FIG. 5 is a view from the direction H1 in FIG. 3. The partition wall 30 includes stiffening ribs 36 in the middle section and through holes 38 on both sides of the stiffening ribs 36. In the region of the stiffening ribs 36 an upper bore 40 and a lower bore 42 are provided in order to allow for an exchange of liquid in the region of the stiffening ribs 36.

Figure 6:
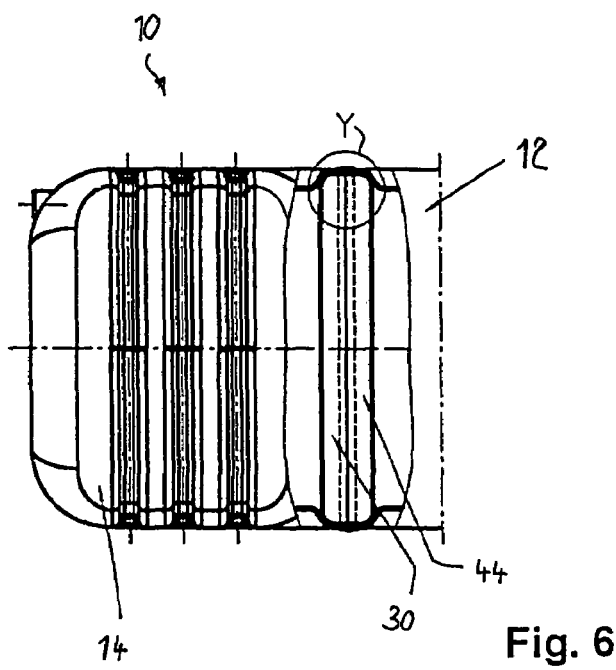
FIG. 6 is a side view of the container in the assembled state.
Figure 7:
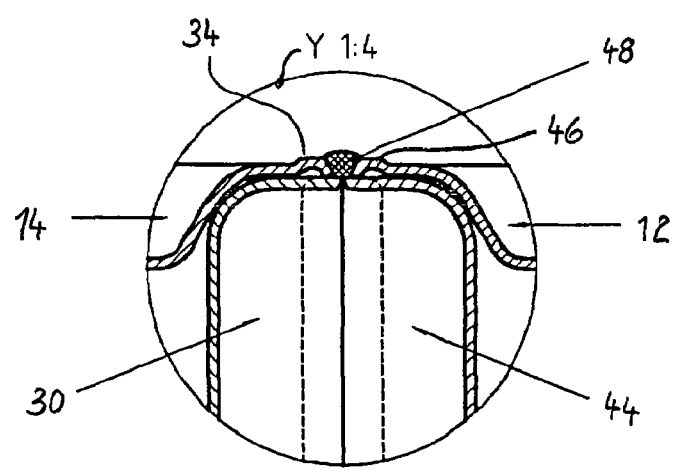
FIG. 7 is a detail from FIG. 6.

FIG. 6 shows the container 10 in the assembled state from the side. The container part 14 is assembled to the container part 12 which can only be seen partly, the partition wall 30 belonging to the container part 14 and a partition wall 44 belonging to the container part 12 facing each other. The detail Y is illustrated in more detail as a cross-section in a ratio of 1:4 in FIG. 7. The partition wall 30 illustrated in FIGS. 3, 4, and 5 has been separated along the circumference at the point 32 and has been inserted into the thus created opening of the container part 14 after being turned by 180°. Something similar is carried out for the container part 12 with the partition wall 44. Thus, the two container parts 12, 14 with their partition walls 30, 44 are facing one another. In the region of the raised edge 34 of the container part 14 and a respective raised edge 46 of the container part 12 a circumferential welding with the melting stock 48 is carried out, while at the same time the outer casing of the container parts 12, 14 as well as the appertaining partition walls 44, 30 are joined to one another. The partition walls 30, 44 include the ribs 36 illustrated in FIG. 5 and form the support device for the absorption of vertical forces. The connection frames 28, 26 of the container parts 14, 12, which are illustrated in FIG. 2, are formed in this embodiment by the end faces of the open container parts 14, 12 and the end faces of the partition walls 30 and 44.

FIGS. 8 to 12 show another embodiment of the invention in which the facing connection frames 26, 28 of the container parts 12, 14 likewise include a support device. Identical parts are denoted by identical reference characters.

Figure 8:
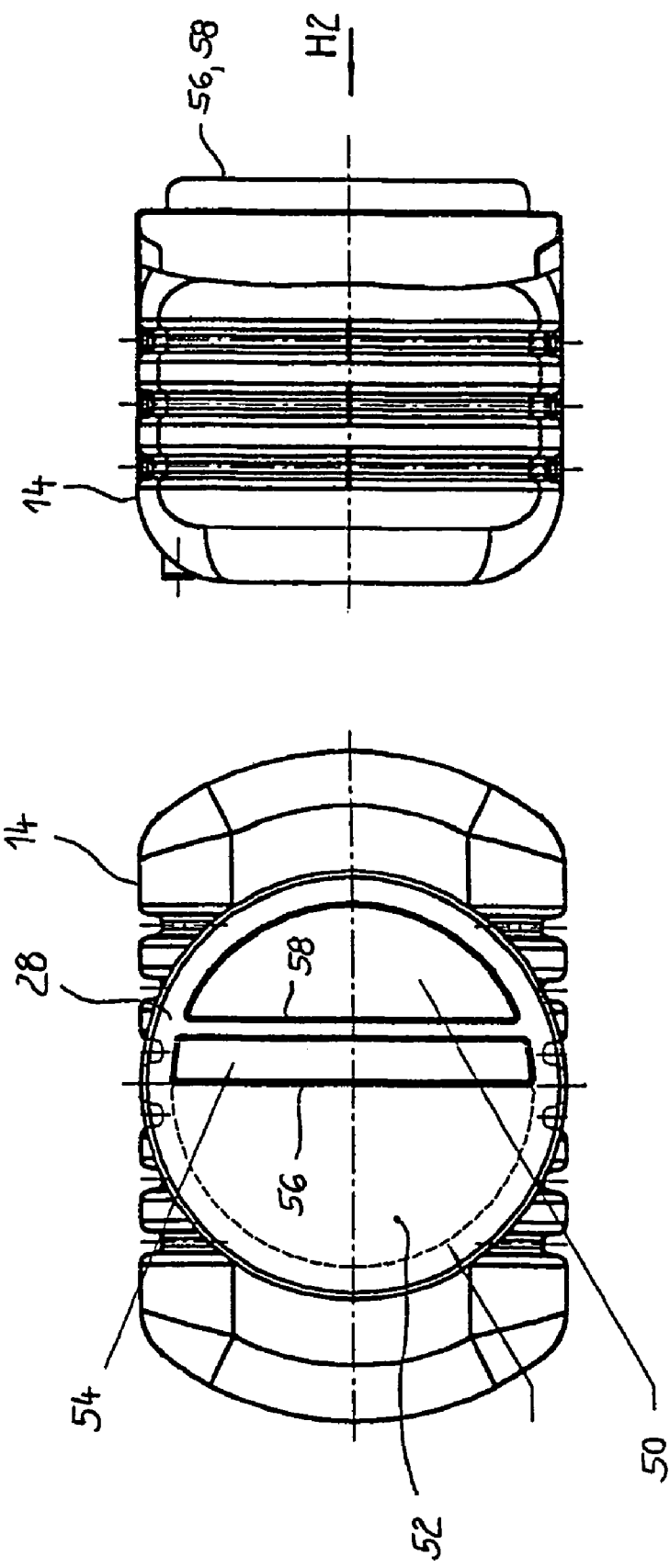
FIG. 8 are views of a further embodiment of the invention.

On the left-hand side of FIG. 8, a front view of the connection frame 28 is shown, which has two sections 50, 52 as a connection opening. The illustration on the left-hand side is a view as seen from the direction H2 of the side view illustrated on the right-hand side. In vertical direction, the connection frame 28 includes a support device 54 having protruding ribs 56, 58.

Figure 9:
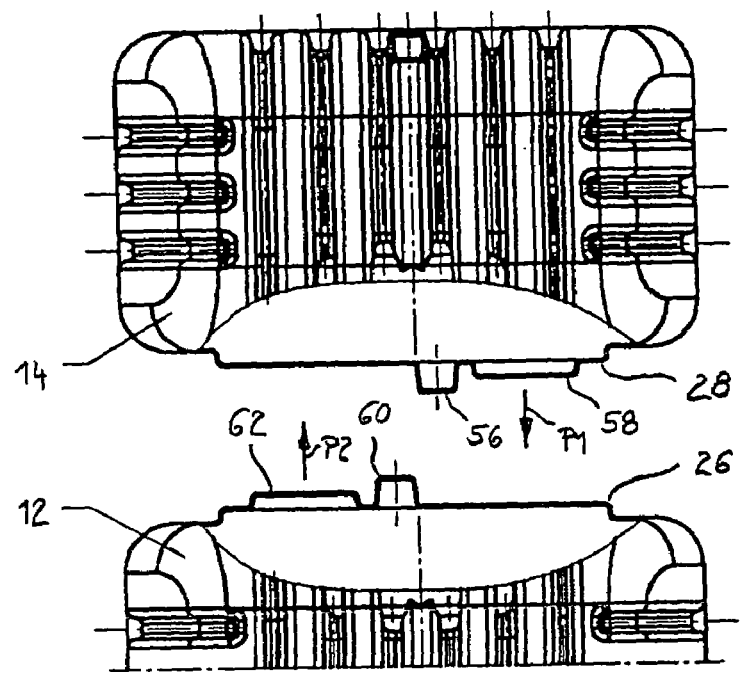
FIG. 9 shows the two container parts prior to their assembly.

FIG. 9 is an illustration showing the two container parts 12, 14 with their associated connection frames 26, 28, the container parts being identical to one another except for the upper walls. The ribs 56, 58 of the container part 14 and the identical ribs 60, 62 of the container part 12 are arranged offset to one another and are moved towards one another according to the arrows P1, P2 during assembly.

Figure 10:
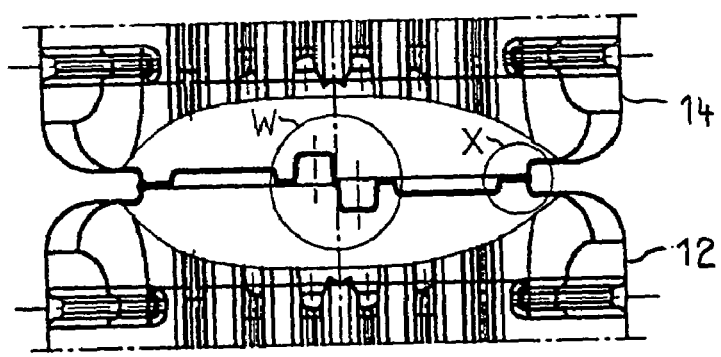
FIG. 10 shows the two container parts assembled together.
Figure 11:
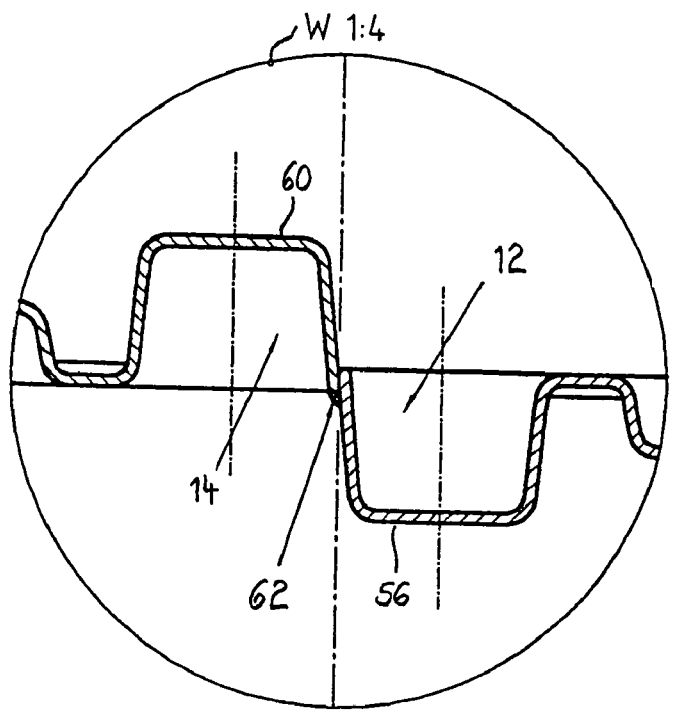
FIG. 11 shows a detail according to FIG. 10 in which ribs are welded together.
Figure 12:
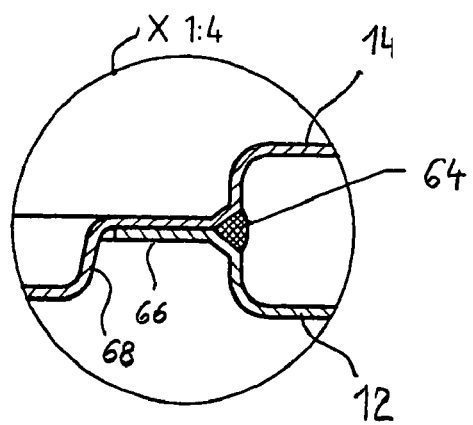
FIG. 12 shows a detail according to FIG. 10 in which the connection frames are welded along their circumference.

FIG. 10 shows the assembly of the container parts 14, 12. The detail W in FIG. 11 as well as the detail X in FIG. 12 show details of the connection of the connection frames 26, 28. In FIG. 11, it is illustrated that the facing ribs 56, 60 are welded to one another at the point 62 in vertical direction. Another possibility is to screw or to rivet the two ribs 56, 60 to on another. As can be seen in FIG. 11, the ribs 56, 60 project into the respective other container part so that further advantages with regard to the support function result.

FIG. 12 shows the detail X indicated in FIG. 10. A welding to the weld deposit 64 is carried out along the two connection frames of the container parts 12, 14, a circumferential edge-shaped centering element 66 formed on the container part 12 resting against a protruding abutting surface 68 formed on the container part 14.

Various modifications can be provided. For example, it can be sufficient to equip only one connection frame with a support device. Further, it is possible that the container parts have different base areas.

Preferably, the container width of a container part is chosen such that it is smaller than the double diameter of the respective connection frame.

LIST OF REFERENCE CHARACTERS 10 container
12, 14 container parts
16 filling and emptying opening
18 filling neck
20 stiffening corrugations
22 lower wall
24 upper wall
26, 28 connection frames
30 partition wall
32 point of separation
34 raised edge
36 stiffening ribs
38 through holes
40 upper bore
42 lower bore
44 partition wall
46 raised edge
48 melting stock
50 opening sections
54 support device
56, 58 ribs
60, 62 ribs
P1, P2 direction arrows
64 weld deposit
66 centering element
68 abutting surface

The invention claimed is:

1. Container made of plastic, the container (10) consisting of two container parts (12, 14) which are connected to one another in the opening region, wherein each container part (12, 14) comprises a horizontally extending upper floor (24) and a lower floor and has a single connection frame (26, 28) including the connection opening, the container parts (12, 14) can be connected to one another along the facing connection frames (26, 28), wherein the container parts (12, 14) are configured for use in the ground, and in that at least one connection frame (26, 28) includes a support device (30, 34; 54) which extends in the connection frame (26, 28) in the vertical direction and is capable of withstanding vertical forces from the ground, wherein the connection frame (26, 28) has a circular shape, the outer diameter of which approximately corresponds to the height of the container (10).

2. Container according to claim 1, wherein the two container parts (12, 14) have a substantially identical structure except for the filling neck (18).

3. Container according to claim 1, wherein the support device (54) includes vertically extending stiffening ribs (56, 58).

4. Container according to claim 3, wherein the stiffening ribs (56, 58) protrude from the plane of the connection frame (26, 28).

5. Container according to claim 3, wherein the stiffening ribs (56, 58) have centering faces (66) on their respective lower and upper ends, said centering faces cooperating with opposite abutting surfaces (68).

6. Container according to claim 1, wherein facing stiffening ribs (56, 58) of the two container parts (12, 14) are connected to one another in the middle area.

7. Container according to claim 1, wherein the support device (54) includes a wall (30, 44).

8. Container according to claim 3, wherein the wall (30, 44) comprises vertically extending ribs (36).

9. Container according to claim 1, wherein the width of each container part (12, 14) is smaller than the double diameter of the respective connection frame (26, 28).

10. Container according to claim 1, wherein it consists of high-molecular high-density polyethylene.

11. Container according to claim 1, wherein for manufacturing the container parts, and if necessary, a mold insert for creating a change in shape is inserted.

12. Container according to claim 1, wherein it has a capacity of 4000 to 6000 liters.

13. Container according to claim 1, wherein it approximately has a square base area.

14. Container made of plastic, the container (10) consisting of two container parts (12, 14) which are connected to one another in the opening region, wherein each container part (12, 14) comprises a horizontally extending upper floor (24) and a lower floor and has a single connection frame (26, 28) including the connection opening, the container parts (12, 14) can be connected to one another along the facing connection frames (26, 28), wherein the container parts (12, 14) are configured for use in the ground, and in that at least one connection frame (26, 28) includes a support device (30, 34; 54) which extends in the connection frame (26, 28) in the vertical direction and is capable of withstanding vertical forces from the ground wherein the support device (54) includes a wall (30, 44), wherein the wall (30, 44) has a cylindrical edge, which is inserted into the connection frame (26, 28), and in that the connection frames (26, 28) of the two container parts (12, 14) are welded together, the welding seam (48) also welding the edge of the wall (30, 44) to the connection frames (26, 28).

* * * * *